United States Patent [19]

Mulleer

[11] Patent Number: 5,045,702

[45] Date of Patent: Sep. 3, 1991

[54] INFRARED INTRUSTION DETECTOR

[75] Inventor: Kurt A. Mulleer, Stafa, Switzerland

[73] Assignee: Cerberus AG, Mannedorf, Switzerland

[21] Appl. No.: 441,362

[22] Filed: Nov. 22, 1989

[30] Foreign Application Priority Data

Nov. 25, 1988 [CH] Switzerland .......................... 4397/88

[51] Int. Cl.⁵ .......................... G01B 13/18; G01J 1/00; G01J 5/10
[52] U.S. Cl. .................. 250/342; 250/338.3; 250/349; 340/567
[58] Field of Search .................. 250/338.2, 338.3, 342, 250/349, 206.1, 208.4; 340/567

[56] References Cited

U.S. PATENT DOCUMENTS

| | | | |
|---|---|---|---|
| 3,793,523 | 2/1974 | Desvignes et al. | 250/206.1 |
| 4,225,786 | 9/1980 | Perlman | 250/342 |
| 4,336,452 | 6/1982 | Baker | 250/338.3 |
| 4,437,003 | 3/1984 | Doctor | 250/338.3 |
| 4,441,023 | 4/1984 | Doctor et al. | 250/338.3 |
| 4,475,040 | 10/1984 | Matsumoto et al. | 250/338.3 |
| 4,614,938 | 9/1986 | Weitman | 250/370.01 |
| 4,618,854 | 10/1986 | Miyake et al. | 340/567 |
| 4,697,081 | 9/1987 | Baker | 250/338.3 |
| 4,800,278 | 1/1989 | Taniguti et al. | 250/338.1 |
| 4,825,079 | 4/1989 | Takamatsu et al. | 250/338.3 |
| 4,914,298 | 4/1990 | Quad et al. | 250/349 |

FOREIGN PATENT DOCUMENTS

| | | | |
|---|---|---|---|
| 57-175226 | 10/1982 | Japan | 250/349 |
| 58-216976 | 12/1983 | Japan | 250/338.3 |
| 2122339 | 1/1984 | United Kingdom | 250/353 |

Primary Examiner—Constantine Hannaher
Assistant Examiner—Edward J. Glick
Attorney, Agent, or Firm—Brumbaugh, Graves, Donohue & Raymond

[57] ABSTRACT

A passive infrared intrusion detector provides improved intruder detection while using a single signal evaluation channel. Pyroelectric sensor element configurations include a diamond pattern with differentially opposed pairs of elements of opposite polarization connected in series for increased coverage and sensitivity.

17 Claims, 4 Drawing Sheets

INFRARED INTRUSTION DETECTOR

BACKGROUND OF THE INVENTION

This invention relates to a passive infrared intrusion detector (PIR intrusion detector) useful for detecting intruders (objects emanating infrared radiation) trespassing in rooms to be protected. Such a PIR intrusion detector comprises a pyroelectric sensor with several radiation-sensitive sensor elements in close spatial relationship for providing signals to an evaluating circuit in order to produce an alarm signal when the output of the sensor exceeds a predetermined threshold value.

PIR intrusion detectors of this general type, for detecting the intrusion of a person or any object emitting infrared radiation in a supervised area, are known in the art.

Such PIR intrusion detectors in general include a lens or other appropriate focusing element which focuses infrared radiation from fields of view onto infrared radiation-sensitive elements which typically include first and second spaced electrodes between which pyroelectric material is positioned. Each of these elements is operative to produce an electric charge proportional to the rate of change of infrared radiation incident thereon. The elements are spaced from one another. Pyroelectric materials include plastic film materials such as polyvinylidene fluoride, crystal materials such as lithium tantalate, and ceramic materials such as lead zirconate titanate. The pyroelectric material of each element is polarized and the sensor elements form a capacitor with a capacitance typically of an order of magnitude of 10 pF. When radiant infrared energy falls upon the material, the polarization of the material is changed, a small electric charge appears between the electrodes due to the internal transfer of electric charge which generates a voltage across a resistance. This voltage is impedance transformed by a field effect transistor FET. The output voltage of the FET is amplified in an evaluation circuit to signal an intrusion. The amplified signal can be used to produce an alarm or to activate flood lamps and/or other deterrents.

In intrusion detection systems it is possible to use detectors having only a single sensor element consisting of pyroelectric material: preferably however, the sensor comprises two or more sensor elements. Such arrays are used for instance to attain a certain immunity to undesired signals caused by changes of the temperature of the environment or changes of the background radiation, by combining the two sensor elements in a differential circuit. According to one prior embodiment of this intrusion detector the sensor elements are arranged in such manner that uniform changes of the radiation incident thereon, for instance changes of the background radiation, produce compensating charges on both sensor elements which are connected in a circuit differentially with result that no output signal is produced. In case radiation from the area to be protected impinges only on one sensor element, a differential output signal is produced.

In such a known infrared detector, a pair of sensor elements is arranged in a common plane and the sensor elements consist of thin wafers of polarized pyroelectric material. Opposite surfaces of the sensor element electrodes, at least one of which is substantially transparent, are arranged in overlapping manner and the electrodes extend in a direction normal to the direction of the polarization. The sensor elements are interconnected within the sensor by means of their electrodes, effectively resulting in two capacitors connected in series or parallel, the polarity of the pyroelectric material of the two sensors within the series or parallel circuit being opposite to each other. Such sensors are called "dual" sensors.

Dual sensors are very useful in intrusion detection systems. A great advantage of the dual sensors is that fluctuations in the thermal state of the background do not result in a change of the output signal of the intrusion detector. In intrusion detectors comprising single sensor elements, such temperature fluctuations cause a fault signal and as a consequence a false alarm.

In Weitman U.S. Pat. No. 4,614,938 an intrusion detection system with a sensor comprising four or more sensor elements is described. The sensor consists of two dual sensors with two separate evaluation channels in the same housing. The four sensor elements are closely spaced to one another and cover substantially all of at least one surface of a single piece of pyroelectric material. Multiple fields of view of areas under surveillance are covered. An advantage of the infrared intrusion detector system of this patent is that occasional spurious current peaks (or bursts or spikes) in the pyroelectric material caused by large changes in the environmental temperature, which with normal dual sensors would result in a false alarm, are suppressed. Only if in both of the evaluation channels concurrent intruder signals are generated, is an alarm output produced. The probability that an occasional spurious signal of the type mentioned occurring coincidentally in both evaluation channels is comparatively small.

However, the infrared intrusion detector system according to U.S. Pat. No. 4,614,938 has the disadvantage that the sensor elements of the two dual sensors are arranged in a staggered way and, consequently, the two separate evaluation channels supervise non-overlapping areas of sensitivity through a coordinated optical system. Consequently, an intruder must cover a greater distance within a few seconds to produce concurrent signals, in order to be positively detected. A further disadvantage of the infrared intrusion detector system according to this patent is that two dual sensors and two separate evaluation channels are necessary and, consequently, two preamplifiers are needed which raises the price of the detector. Further, the reliability of the detector against false alarms caused by turbulent warm or cold air and by radio frequency interferences is not better than with a normal dual sensor, since these disturbances penetrate both of the evaluation channels.

In Baker U.S. Pat. No. 4,697,081 it is suggested that the disadvantage of the non-overlapping areas of sensitivity and consequent need for an intruder to cover a greater distance within a predetermined time can be overcome, by using a detector wherein one pyroelectric sensor element of one dual sensor is interdigitated with a respective sensor element of the other dual sensor. As a consequence, through the optical system of the detector both evaluation channels supervise practically the same area, the intrusion signal appears without delay in both channels, the distance which an intruder has to cover is reduced, and the detection is more positive. However, the other above-mentioned disadvantages are not affected by this arrangement of the sensor elements.

SUMMARY OF THE INVENTION

Therefore, with the foregoing in mind, it is a primary object of the invention to provide a new and improved construction of a passive infrared detector and, more particularly, a PIR intrusion detector useful in detecting intruders trespassing into rooms to be protected and avoiding the above-mentioned disadvantages of the prior art detectors.

A further object of the invention is to provide a new and improved construction of the PIR intrusion detector wherein the arrangement of the sensor elements allows a better adaptation of the dimensions of the sensor elements to the shape of an upright walking man having a ratio of breadth to height of approximately 1:5.

Other objects of the invention are to provide new and improved pyroelectric sensors which in comparison with the pyroelectric sensors of the prior art can collect more information with the same area of sensor elements without being subject to other disadvantages of such prior art sensors, as well as sensors which achieve such operation while requiring only a single signal evaluation channel.

In order to implement these and other objects of the invention, which will become more readily apparent as the description proceeds, features of the passive infrared intrusion detector of the present invention include:

(1) a pyroelectric sensor having two pyroelectric sensor elements connected in parallel or in series whose elements are further connected in series with two other pyroelectric sensor elements which in turn are connected in parallel or in series with one another, and (2) a field effect transistor as impedance transforming element of a single evaluation channel coupled to the sensor.

According to one embodiment of a passive infrared intrusion detector of this invention the pyroelectric sensor (3) comprises first (41) and second (42) elongated pyroelectric sensor elements connected in parallel with one another and connected in series with third (43) and fourth (44) elongated pyroelectric sensor elements connected in parallel with one another; the first (41) and third (43) pyroelectric sensor elements both being of a first polarization are spaced apart from one another and in parallel on the surface of a substrate and the second (42) and the fourth (44) pyroelectric sensor elements being of reverse polarity are spaced between the first (41) and third (43) pyroelectric sensor elements. In another embodiment the four pyroelectric sensor elements are arranged with small gaps between them and form a rectangle on the surface of a substrate.

According to another embodiment of the invention, the pyroelectric sensor (3) comprises, a first pair of sensor elements consisting of first (41) and second (42) sensor elements connected in parallel with one another, a second pair of sensor elements consisting of third (43) and a fourth (44) sensor elements connected in parallel with one another, said first and said second pairs of sensor elements being connected in series, and a first resistor (51) connected in parallel with the first pair of sensor elements and a second resistor (52) connected in parallel with a second pair of sensor elements.

In another embodiment of the invention, the pyroelectric sensor (3) comprises, a first pair of sensor elements consisting of first (41) and second (42) sensor elements connected in series with one another, a second pair of sensor elements consisting of third (43) and fourth (44) sensor elements connected in series with one another, said first and said second pairs of sensor elements being connected in series, and four resistors (51, 52, 53, 54) each of which is connected in parallel with one of the sensor elements (41, 42, 43, 44). In other embodiments: a fifth (55) resistor is connected in parallel with the first four resistors between the gate terminal (G) of the field effect transistor (8) and ground; or a sixth (56) resistor connects the junction point between the first (41) and second (42) sensor elements with the junction point between the first (51) and second (52) resistors and a seventh (57) resistor connects the junction point between the third (43) and fourth (44) sensor elements with the junction point between the third (53) and fourth (54) resistors.

Further in accordance with the invention, a pyroelectric sensor includes four elongated pyroelectric sensor elements arranged with first and third elements of a first polarization spaced apart in parallel relationship and second and fourth elements of the reverse polarity positioned between and parallel to said first and third elements in end to end relationship, with insulative substrate means attached to a small portion of the back surface of each sensor element for supporting them in spaced relationship. The sensor also includes conductor means for connecting the first and second sensor elements as a differentially opposed first pair of elements, connecting the third and fourth sensor elements as a differentially opposed second pair of elements, and connecting the first and second pairs of elements in series, and output means for coupling signals to a single evaluation channel. Coupling means, comprising first resistive means coupled in parallel with the first pair of sensor elements and second resistive means coupled in parallel with the second pair of sensor elements, are included for developing a composite signal in response to signals developed by the sensor elements and coupling it between the output means and ground.

The invention and its mode of operation will be more fully understood from the following detailed description when studied with the accompanying drawings.

DETAILED DESCRIPTION OF THE PREFERRED EMBODIMENTS

Figure 1:
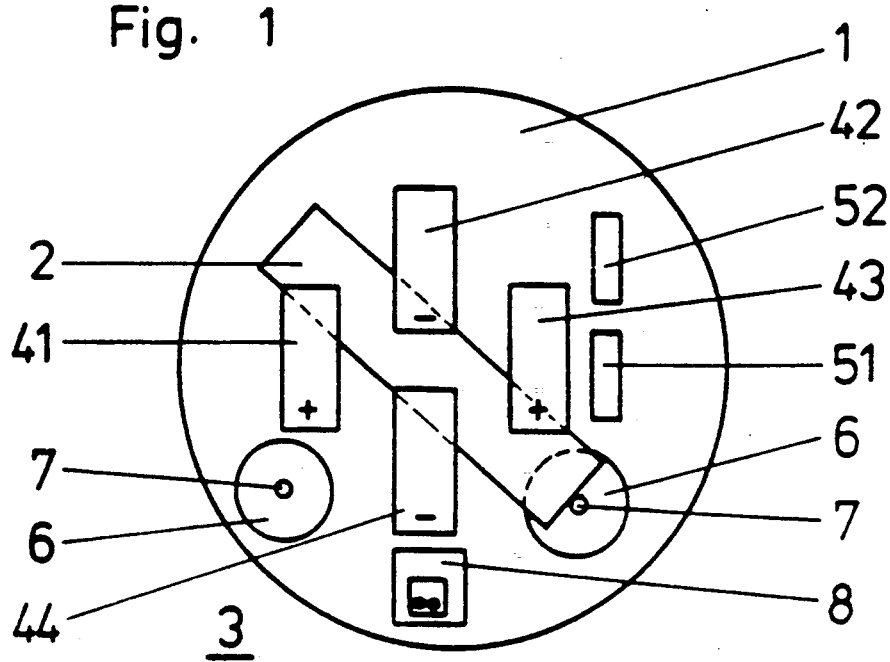
FIG. 1 is a top view of pyroelectric sensor according to the present invention.

FIG. 1 shows the top view of a pyroelectric sensor 3 of a passive infrared intrusion detector (PIR intrusion detector) according to the present invention. The pyroelectric sensor 3 includes a metal base 1. An insulative rectangular substrate 2, typically being 0.4 mm thick and consisting of alumina, is attached to this base 1. Four elongated rectangular pyroelectric sensor elements 41, 42, 43, 44 (for instance EPO-TEK H32C of Polyscience Ltd., Switzerland) are attached to this substrate 2 in a predetermined pattern such that only a small portion, such as one corner, of the sensor element is fastened to the substrate 2. The four pyroelectric sensor elements 41, 42, 43, 44 can be arranged in such manner that the two middle sensor elements 42, 44, not belonging to a pair of pyroelectric sensor elements connected electrically in parallel with one another, are positioned with their small edges facing each other and a small gap between the edges. The other two pyroelectric sensor elements 41, 43 are situated on the right and on the left side and parallel to the long edges of the pyroelectric sensor elements 42, 43 as can be seen from FIG. 1.

Figure 2:
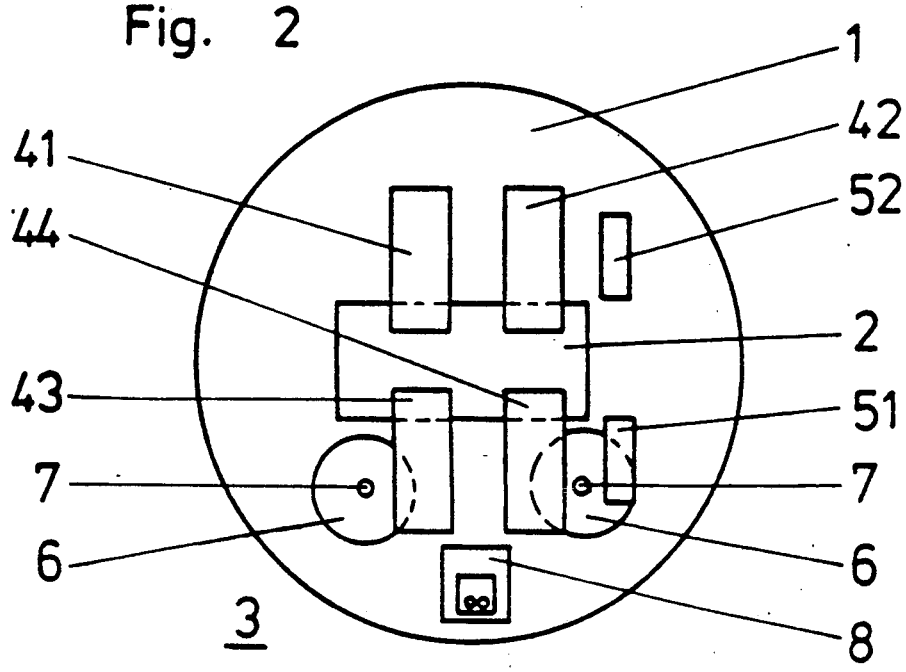
FIG. 2 is a top view of a second embodiment of a pyroelectric sensor according to the invention.

Alternatively, as shown in FIG. 2, the four pyroelectric sensor elements 41, 42, 43, 44 can be arranged as two pairs situated side by side in parallel. The two sensor elements forming a pair and being situated side by side are connected electrically in parallel. The four pyroelectric sensor elements 41, 42, 43, 44 are fastened to the substrate 2 only with one of the small edges while the greatest part of the sensor elements projects beyond the substrate 2.

In both the above embodiments of the PIR intrusion detector of the present invention the electrical connections (shown in later Figures) are conducted through connection pins 7 contained in glass insulators 6 to an external evaluation circuit (not shown). A junction-gate field effect transistor 8 (FET) and two resistors 51, 52 connected electrically in parallel with the sensor elements 41, 42 and 43, 44, respectively, are situated on the base 1. Additional resistors used in other embodiments may be similarly mounted on the base 1.

Figure 3:
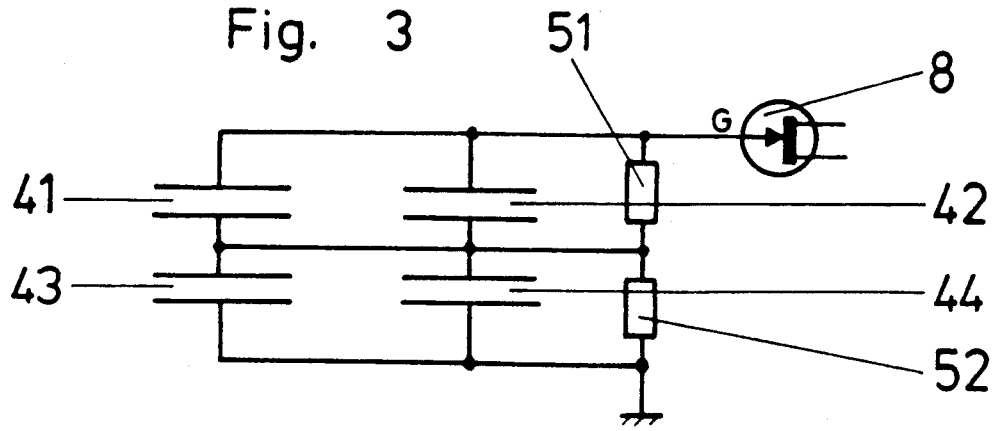
FIG. 3 is a wiring diagram of a circuit of a pyroelectric sensor according to the invention.

With reference to FIG. 3, there is shown a circuit diagram for the pyroelectric sensor according to FIG. 1 or 2. The four pyroelectric sensor elements 41, 42, 43, 44 are connected two and two with a resistor 51, 52 connected in parallel with each pair of sensor elements. The first sensor element 41 and the second sensor element 42 form a first pair of pyroelectric sensor elements and the third sensor element 43 and the fourth sensor element 44 form a second pair of sensor elements. Each pair includes elements of opposite polarity differentially interconnected to reduce effects of changes in background radiation, etc., as discussed above. Said first pair of sensor elements 41, 42 is connected in series with said second pair of sensor elements 43, 44. Coupling means connect both said pairs of sensor elements in series between output means for coupling signals to a single evaluation channel, shown as the gate terminal of a junction field effect transistor 8, and a point of common voltage, shown as ground. The coupling means, shown as first resistive means 51 coupled in parallel with the first pair of sensor elements and second resistive means 52 coupled in parallel with the second pair, develops a composite signal in response to signals developed by the plurality of sensor elements and couples the composite signal between the gate terminal and ground. The field effect transistor is the input of a single evaluation channel of an evaluation circuit (not shown) which can be provided by those skilled in the art, based on prior technology.

Figure 4:
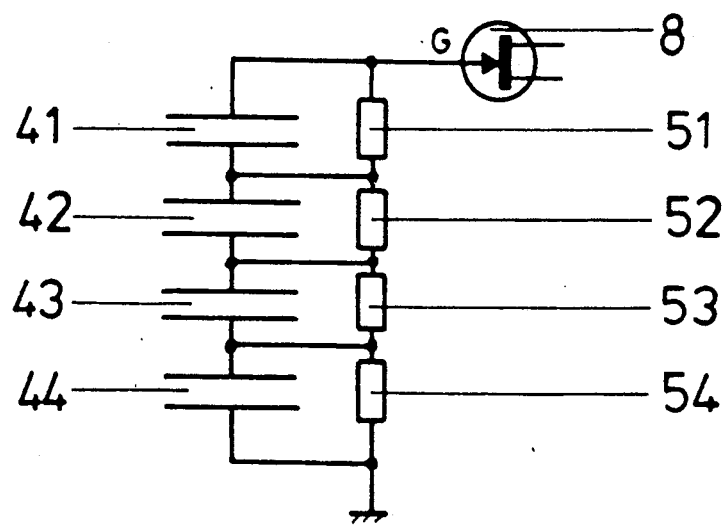
FIG. 4 is a wiring diagram of a second form of circuit of a pyroelectric sensor of the invention.
Figure 5:
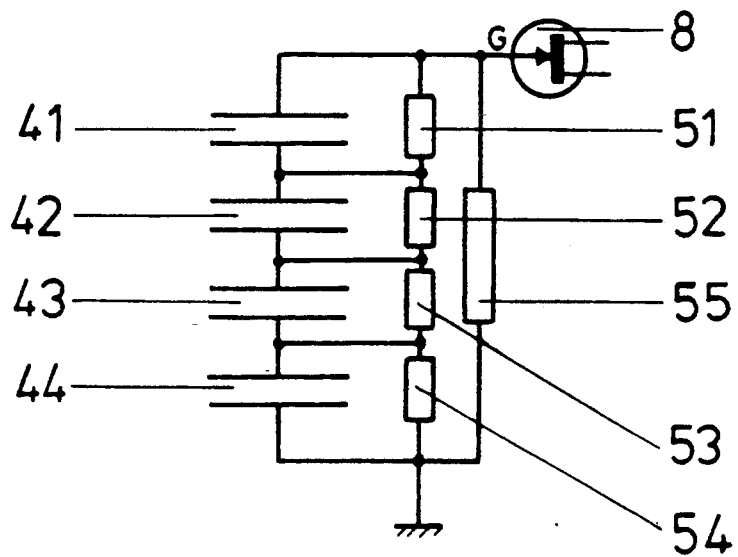
FIG. 5 is a wiring diagram of a third form of circuit of a pyroelectric sensor of the invention.
Figure 6:
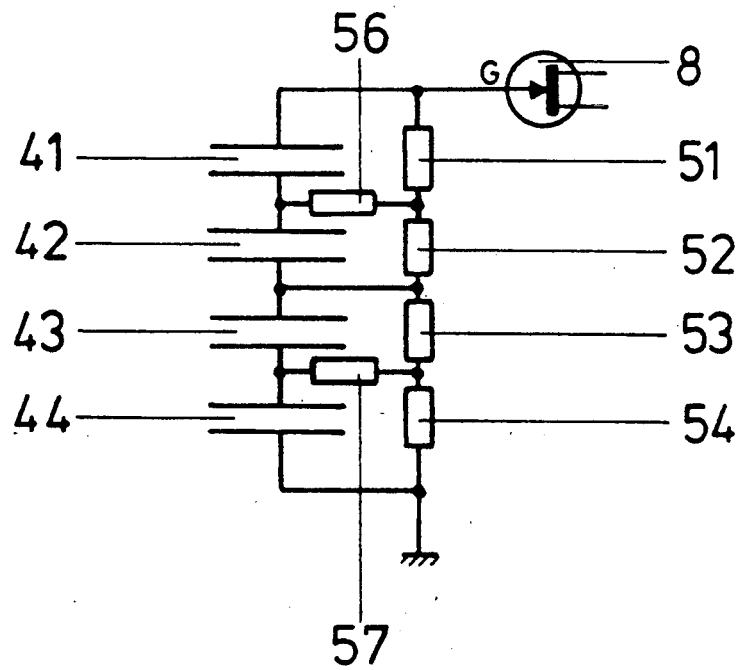
FIG. 6 is a wiring diagram of a fourth form of circuit of a pyroelectric sensor of the invention.

With reference to FIGS. 4, 5 and 6, further embodiments of pyroelectric sensors according to the present invention are described in more detail. In FIG. 4, each of the four sensor elements 41, 42, 43 and 44 is connected with a resistor 51, 52, 53, 54 in parallel with each sensor element. The pairs of pyroelectric sensor elements with the resistors in parallel thereto are connected in series between the gate terminal of a junction field effect transistor 8 and ground. The field effect transistor is the input of a single evaluation channel of an evaluation circuit (not shown). The resistors 51, 52, 53, and 54 should typically have an impedance of approximately 100 Gigaohm.

In the FIG. 5 embodiment, in addition to the circuit according to FIG. 4, the gate terminal G of the field effect transistor 8 is connected to ground through a fifth resistor 55 parallel with the sensor elements 41, 42 43. 44 and with the resistors 51, 52, 53 and 54. The fifth resistor 55 should have an impedance of approximately 100 Gigaohm, while the other resistors 51, 52, 53 and 54 have each an impedance of 0.5 to 1 Teraohm. These resistors serve to fix the potentials between the sensor elements.

In the FIG. 6 embodiment, each of the four sensor elements 41, 42, 43 and 44 is connected with a resistor 51, 52, 53 and 54 in parallel with each sensor element. The four pyroelectric sensor elements 41, 42, 43 and 44 with the four resistors 51, 52, 53 and 54 in parallel therewith are connected in series between the gate terminal of a junction field effect transistor 8 and ground. Instead of the fifth resistor described with reference to FIG. 5 there is a sixth resistor 56 connecting the junction point between the first 41 and second 42 sensor elements with the junction point between the first 51 and second 52 resistors, and a seventh 57 resistor connecting the junction point between the third 43 and fourth 44 sensor elements with the junction point between the third 53 and fourth 54 resistors. The field effect transistor is the input of a single evaluation channel of an evaluation circuit (not shown). The first to fourth resistors 51, 52, 53, and 54 should have an impedance of approximately 100 Gigaohm and the sixth and seventh resistors 56 and 57 should have an impedance of 0.5 to 1 Teraohm.

In all of these arrangements, in each pair of sensor elements the polarity of the pyroelectric material of the sensors in parallel or series is arranged to be in opposition to provide a differential output as previously discussed.

Figure 7:
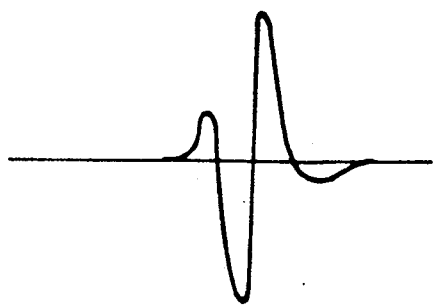
FIG. 7 shows a typical signal waveform of a sensor according to FIGS. 1 and 3.
Figure 8:
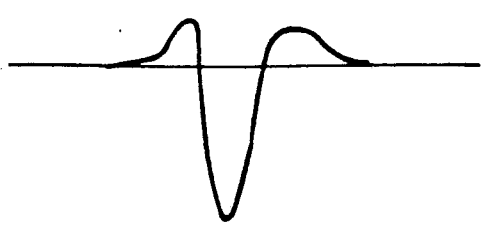
FIG. 8 shows a typical signal waveform of a sensor according to FIGS. 2 and 3.

With reference to FIGS. 7 and 8, characteristic forms of the signals of the pyroelectric sensors according to FIGS. 1 and 2 are shown for an intruder passing at a distance of 12 m with a speed of 50 cm through the beam of sensitivity when used with an intrusion detector lens system of approximately 30 mm focal length.

The pyroelectric sensor according to FIG. 1 provides symmetrical signals. With this pyroelectric sensor, using circuits known in the art, it is possible to set a very simple double threshold evaluation having a positive and a negative detection threshold of the same magnitude. However, the signal values of the main peaks do not have double magnitude but only approximately 1.5 times the value of a single evaluation channel as used in U.S. Pat. Nos. 4,614,938 or 4,697,081. The pyroelectric sensor 3 according to FIG. 5 shows asymmetric signal forms of the same form as those of one channel of the pyroelectric sensors of those patents, however, the signals have double amplitude. By applying circuits known in the art a double threshold evaluation is possible by using two different detection threshold values adapted to the signal; however, this evaluation is more complicated and consequently more expensive. This drawback can be overcome by using an integrated circuit for the evaluation.

Figure 9:
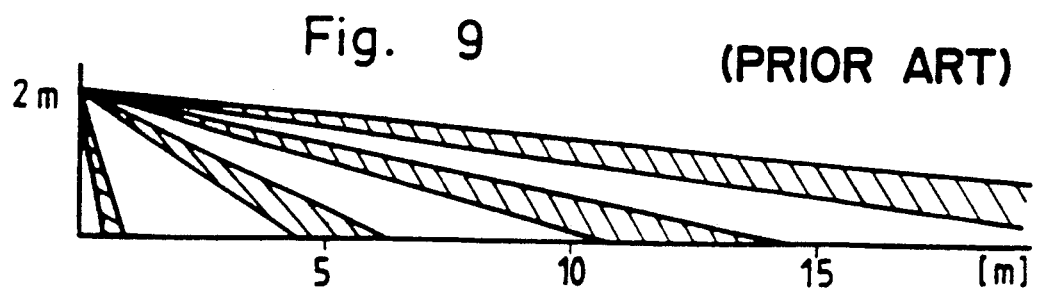
FIG. 9 is a side view of patterns of sensitivity of a passive infrared intrusion detector of the prior art.

FIG. 9 shows a side view of the pattern of radiation detection zones of an infrared radiation detector according to the prior art. The infrared radiation detector is mounted on a wall 2 m above the ground; the hatched areas show those zones (radiation detection zones), wherein the detector can detect infrared radiation through an associated optical system.

Figure 10:
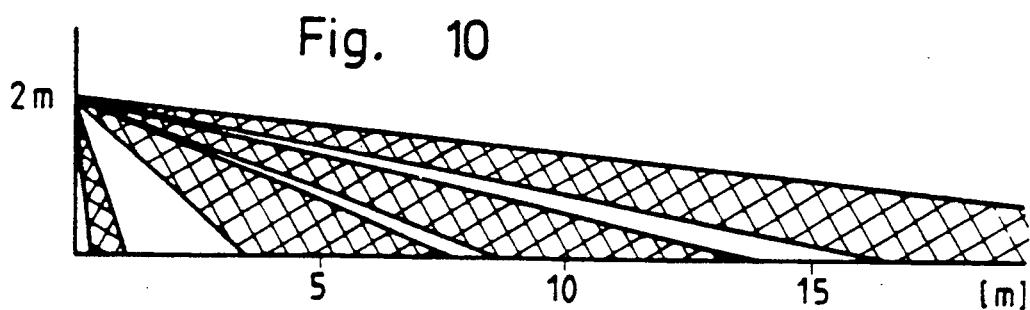
FIG. 10 is a side view of patterns of sensitivity of a passive infrared intrusion detector according to the invention.

FIG. 10 shows a side view of the pattern of radiation detection zones of the infrared radiation sensor which is the subject of this invention in combination with prior art optical systems and evaluation circuits. The infrared radiation detector is mounted on a wall 2 m above the ground; the cross-hatched areas show those zones (radiation detection zones), wherein the detector can detect infrared radiation through the corresponding optical system. Use of the present invention permits the room to be monitored more effectively by radiation sensitive zones as indicated.

Figure 11:
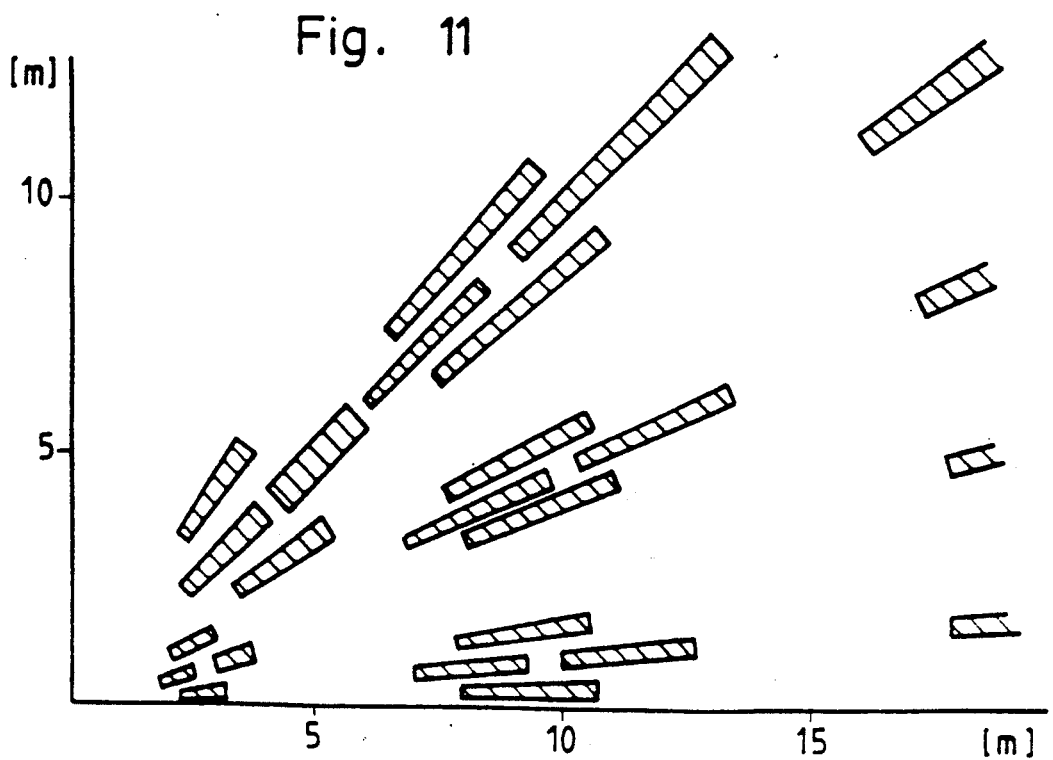
FIG. 11 is a top view of a part of patterns of sensitivity of a passive infrared intrusion detector using a pyroelectric sensor according to FIG. 1.

FIG. 11 shows a cross-section of a part of the radiation detection zones achievable by use of the invention. The cross-section is taken closely above the ground. The hatched areas correspond to the projection of the sensor elements through an associated optical system of the infrared radiation detector to the ground. Only the near zones and the medium zones are shown in full; the farthest zones are only partially shown.

The passive infrared intrusion detector which is the subject of this invention is a detector which can be very easily constructed and which enables very tight coverage of the room to be protected. It is considerably more sensitive than the passive infrared intrusion detectors of the prior art. An intruder walking upright through the area to be monitored produces a signal of double amplitude as discussed with reference to the prior art. This renders it possible either to make the infrared intrusion detector doubly sensitive or to double the detection threshold values of the detector and thereby reduce the probability of false alarms due to air turbulence and radio frequency interferences.

Using the FIG. 1 embodiment with suitable optics, a detector comprising a pyroelectric sensor, according to the invention, covers a solid angle of larger magnitude than a pyroelectric sensor according to U.S. Pat. Nos. 4,614,938 or 4,697,081. This has the effect that hot spots in the background of the detector caused by heaters, sunshine, switching lamps, give a signal which is smaller relative to the detection threshold than with the detectors according to these patents.

While particular embodiments of the invention have been described, various modifications will be apparent to those skilled in the art, and therefore it is not intended that the invention be limited to the described embodiments or to details thereof, and departures may be made therefrom within the spirit and scope of the invention.

I claim:

1. In a passive infrared detector of the type wherein optical means are arranged to focus infrared radiation on a pyroelectric sensor for detecting changes in infrared radiation and an evaluation circuit coupled to the sensor is arranged to develop signals indicative of detected changes in infrared radiation, a pyroelectric sensor comprising:
   a plurality of elongated radiation sensitive sensor elements, arranged in a pattern of laterally spaced pairs with at least one element of each pair longitudinally spaced from an element of a different pair, comprising a first pair of opposite polarity sensor elements interconnected electrically and a second pair of opposite polarity sensor elements interconnected electrically, said first and second pairs of elements being electrically connected in series;
   output means for coupling signals to a single evaluation channel; and
   coupling means, comprising first resistive means coupled to said first pair of sensor elements and second resistive means coupled to said second pair of sensor elements, for developing a composite signal in response to signals developed by said sensor elements and coupling said composite signal to said output means;
   whereby the operation of said detector benefits from the differential interconnection of each of said pairs of sensor elements in combination with the increased sensitivity provided by the combination of said pairs of elements, while requiring only a single evaluation channel.

2. In a passive infrared detector, a pyroelectric sensor as in claim 1, in which said first pair of sensor elements comprises first and second elongated pyroelectric elements and said second pair comprises similar third and fourth sensor elements; the first and third sensor elements being of a first polarization are spaced apart from one another in parallel relationship, and the second and fourth sensor elements being of the reverse polarization are spaced between the first and third sensors in a spaced end-to-end relationship.

3. In a passive infrared detector, a pyroelectric sensor as in claim 1, in which said first and second pairs of sensor elements comprise four elongated rectangular pyroelectric sensor elements closely spaced from each other with small gaps between each sensor and arranged in a rectangular pattern.

4. In a passive infrared detector, a pyroelectric sensor as in claim 1, 2 or 3, in which each of said pairs of sensor elements comprises two elements connected in parallel, and the two pairs of elements are connected in series.

5. In a passive infrared detector, a pyroelectric sensor as in claim 1, 2 or 3, in which each of said pairs of sensor elements comprises two elements connected in series, and the two pairs of elements are connected in series.

6. In a passive infrared detector, a pyroelectric sensor as in claim 1, 2, or 3, in which each of said pairs of sensor elements comprises two elements connected in parallel, the two pairs of elements are connected in series, the first resistive means comprises a resistor connected in parallel with said first pair of sensor elements and the second resistive means comprises a resistor connected in parallel with said second pair of sensor elements.

7. In a passive infrared detector, a pyroelectric sensor as in claim 1, 2 or 3, in which each of said pairs of sensor elements comprises two elements connected in series, the two pairs of elements are connected in series, the first resistive means comprises two resistors, one coupled in parallel with each element of said first pair of elements, and the second resistive means comprise two resistors, one coupled in parallel with each element of said second pair of elements.

8. In a passive infrared detector, a pyroelectric sensor as in claim 1, 2 or 3, additionally comprising third resistive means, connected in parallel with said first and second resistive means, for coupling said composite signal between said output means and a point of common voltage.

9. In a passive infrared detector, a pyroelectric sensor as in claim 7, additionally comprising third resistive means, connected in parallel with said four resistors of the first and second resistive means, for coupling said composite signal between said output means and a point of common voltage.

10. In a passive infrared detector, a pyroelectric sensor as in claim 7, additionally comprising a resistor connecting the junction point between the first series pair of sensor elements with the junction point between the two resistors associated with said elements, and a resistor similarly connecting the junction point between the second series pair of sensor elements with the junction point between the two resistors associated with said elements.

11. In a passive infrared detector, a pyroelectric sensor as in claim 1, 2 or 3, additionally comprising insulative substrate means attached to a small portion of the back surface of each of said sensor elements for supporting said elements in said predetermined pattern, and support means for supporting all the recited elements of the sensor.

12. A pyroelectric sensor for use in a passive infrared detector, comprising:
four elongated pyroelectric sensor elements arranged with first and third elements of a first polarization spaced apart in parallel relationship and second and fourth elements of the reverse polarity positioned between and parallel to said first and third elements in end to end relationship;
insulative substrate means attached to the back surface of each of said sensor elements for supporting said elements in said spaced relationship;
conductor means for connecting said first and second sensor elements as a differentially opposed first pair of elements, connecting said third and fourth sensor elements as a differentially opposed second pair of elements, and connecting said first and second pairs of elements in series;
output means for coupling signals to a single evaluation channel;
coupling means, comprising first resistive means coupled in parallel with said first pair of sensor elements and second resistive means coupled in parallel with said second pair of sensor elements, for developing a composite signal in response to signals developed by said sensor elements and coupling said composite signal between said output means and a point of common voltage; and
support means for supporting the foregoing elements of the sensor;
whereby the sensor obtains the operational benefits of the differential interconnection of said sensor elements and increased sensitivity provided by the series combination of pairs of such elements, enabling operation with a single signal evaluation channel.

13. A pyroelectric sensor as in claim 12, in which each of said pairs of sensor elements comprises two elements connected in parallel.

14. A pyroelectric sensor as in claim 12, in which each of said pairs of sensor elements comprises two elements connected in series.

15. A pyroelectric sensor as in claim 14, additionally comprising third resistance means coupled in parallel with said first and second resistive means.

16. A pyroelectric sensor as in claim 14, in which said first and second resistive means each comprises a pair of resistors in series with the junction point between each such pair of resistors connected to the junction point between the associated pair of sensor elements.

17. A pyroelectric sensor as in claim 16, additionally comprising two resistors each coupled between said junction point between one such pair of resistors and said junction point between the associated pair of sensor elements.

* * * * *